(12) United States Patent
Govindan et al.

(10) Patent No.: US 11,233,667 B2
(45) Date of Patent: Jan. 25, 2022

(54) DETERMINISTIC ASSIGNMENT OF OVERLAY MULTICAST TRAFFIC

(71) Applicant: Cisco Technology, Inc., San Jose, CA (US)

(72) Inventors: Vengada Prasad Govindan, Chennai (IN); Aswin Kuppusami, Chennai (IN); Stig Venaas, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 16/751,201

(22) Filed: Jan. 23, 2020

(65) Prior Publication Data

US 2021/0234714 A1   Jul. 29, 2021

(51) Int. Cl.
*H04L 12/18* (2006.01)
*H04L 12/851* (2013.01)

(52) U.S. Cl.
CPC .......... *H04L 12/18* (2013.01); *H04L 47/2441* (2013.01)

(58) Field of Classification Search
CPC . H04L 12/18; H04L 47/2441; H04L 12/4633; H04L 12/1886; H04L 12/4641
See application file for complete search history.

(56) References Cited

U.S. PATENT DOCUMENTS

| 10,333,725 B2* | 6/2019 | He .................... H04L 12/1886 |
| 10,567,187 B2* | 2/2020 | Mathew ............. H04L 12/1886 |
| 10,880,112 B2* | 12/2020 | Immidi ................ H04L 12/185 |
| 10,999,195 B1* | 5/2021 | Suryanarayana ....... H04L 45/16 |
| 2020/0245206 A1* | 7/2020 | Allan ...................... H04L 45/04 |

OTHER PUBLICATIONS

Farinacci, D., et al., "The Locator/ID Separation Protocol (LISP) for Multicast Environments," Internet Engineering Task Force (IETF), RFC 6831, 2013, 29 pages.
Johnson, G., "Overlay Transport Virtualization—Cisco Systems," BRKRST-2033, 2009, 31 pages.
Moreno, V., et al. "Signal-Free Locator/ID Separation Protocol (LISP) Multicast," Internet Engineering Task Force, RFC 8378, 2018, 22 pages.

* cited by examiner

*Primary Examiner* — Chandrahas B Patel
(74) *Attorney, Agent, or Firm* — Meunier Carlin & Curfman LLC

(57) ABSTRACT

In an aspect, an embodiment of the present disclosure is directed to network control topology that implements a centralized network controller to deterministically assign, and reassign, underlay multicast groups according to one or more policies and/or parameterized intent of the network administrator. The centralized network controller, in some embodiments, comprises a map server-map resolver controller configured to provide deterministic and centralized allocation of LISP underlay multicast groups, e.g., to provide security, traffic engineering, network and resource management.

24 Claims, 9 Drawing Sheets

DETERMINISTIC ASSIGNMENT OF OVERLAY MULTICAST TRAFFIC

TECHNICAL FIELD

Embodiments of the present invention relate to the control of traffic in a network, in particular, control of overlay multicast traffic in a software-defined network (SDN), such as a LISP network.

BRIEF DESCRIPTION OF THE DRAWINGS

The accompanying figures, which are incorporated herein and form part of the specification, illustrate transmit power control of access point with active feedback. Together with the description, the figures further serve to explain the principles of the multi-level resource reservation described herein and thereby enable a person skilled in the pertinent art to make and use the transmit power control of access point with active feedback.

DESCRIPTION OF THE EXAMPLE EMBODIMENTS

Overview

Figure 1:
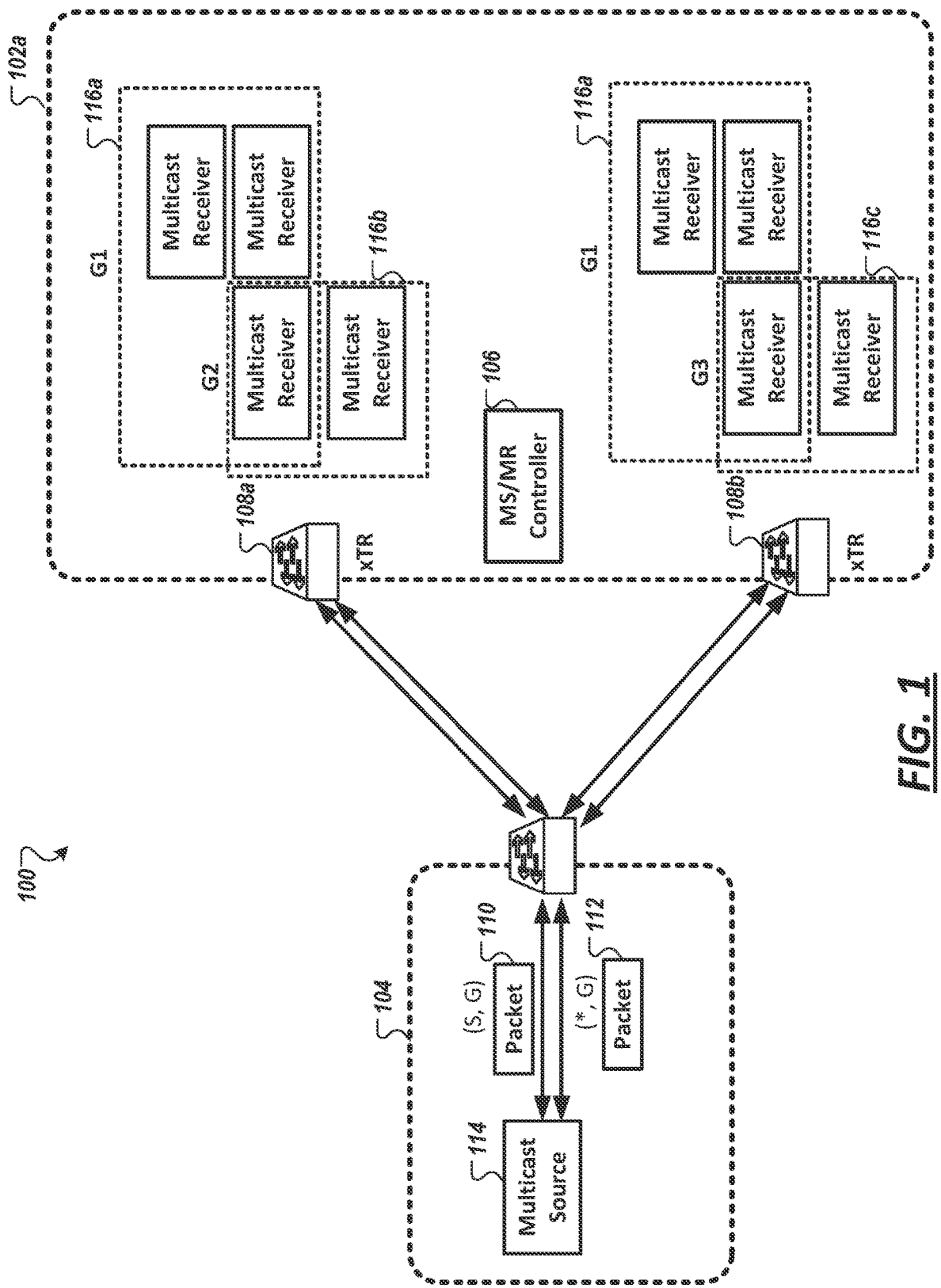
FIG. 1 is a diagram of an example network comprising a centralized network controller of a first network configured to deterministically assign and reassign overlay multicast traffic native to a second network to an underlay multicast group of the first network in accordance with an illustrative embodiment.

In an aspect, an embodiment of the present disclosure is directed to network control topology that implements a centralized network controller to deterministically assign, and reassign, underlay multicast groups according to one or more policies and/or parameterized intent of the network administrator. The centralized network controller, in some embodiments, comprises a map server-map resolver controller configured to provide deterministic and centralized allocation of LISP underlay multicast groups, e.g., to provide security, traffic engineering, network and resource management. In LISP Layer-3 native multicast, mapping between an overlay multicast group (native) to the underlay LISP-multicast group is done through a hash operator. Such mapping from the overlay to the underlay group often results in unwanted traffic to be sent to LISP ETRs. In addition to being a waste of link bandwidth, such unwanted traffic can pose as a security issue.

By deterministically assigning and/or assigning mapping between an overlay multicast group (native) to the underlay multicast group (e.g., underlay LISP-multicast group), network administrators can engineer multicast traffic to enforce service-level agreement (SLA) and prevent, or minimize, SLA breaches. In addition, by deterministically assigning and/or assigning mapping between an overlay multicast group (native) to the underlay multicast group, unwanted traffic can be minimized, or prevented, thus improving the efficiency of certain TCAM utilization depending on nature of traffic. In addition, by deterministically assigning and/or assigning mapping between an overlay multicast group (native) to the underlay multicast group (e.g., underlay LISP-multicast group), network administrators can also set site-specific policies or across-site policies for a multicast traffic stream. In addition, by deterministically assigning and/or assigning mapping between an overlay multicast group (native) to the underlay multicast group (e.g., underlay LISP-multicast group), network administrators can quarantine suspicious traffic. In some embodiments, the centralized network controller can consistently apply the mapping so the same mapping is presented on all xTRs.

Today's modern networks are typically managed through manual configuration and fragmented tools and are prone to errors. Issues are exacerbated because of a constantly changing network that is growing in number of users and devices as well as different devices types, making the configuring and maintaining of such network ever more challenging in being to apply a consistent policy across the network. Software-Defined Network (SDN) technology offers some solution in providing automated control of end-to-end services for various applications, which can be applied across a heterogeneous wireless and wired network over a single network fabric. In addition to the centralized network controller deterministically assigning, and reassigning, underlay multicast groups, the centralized network controller can also address many of these issues.

In some embodiments, the centralized network controller is configured to aggregate multiple overlay groups to a set of underlay groups when the grouping are associated with a same set of one or more xTR (e.g., to improve switch gear utilization of TCAM). In some embodiments, the centralized network controller is configured to separate overlay groups having separate underlay groups when the grouping are across different sets of xTRs (e.g., to save bandwidth and improve security).

In a LISP network, for example, the centralized network controller may be implemented a combined map server/resolver to deterministically assign, and reassign, a large number of flows (e.g., <S-EID, G> flows) of an overlay multicast group to a few flows (e.g., <S-RLOC, G> flows) in a LISP layer 3 native group. As used herein, the term "assign" is used interchangeably with the term "mapping." The centralized network controller in implementing such assignment and reassignment can thus reduce, or eliminate, unwanted traffic being sent to LISP ETRs, which serves to reduce or eliminate security risks and issues associated with such unwanted traffic while also improving link bandwidth and network switch-gear utilization efficiency. In some embodiments, the centralized network controller and its corresponding operation can be used to engineer multicast traffic according to policies and/or intent of the network administrator to enforce and/or manage service level agreement.

As used herein, "policies" generally refers to sets of conditions, constraints, and/or settings that allow a network administrator to designate access to a network, including the circumstances under which traffic can be routed through or not through the network.

As used herein, "intent" generally refers to operational intent or goals that can be translated into policies that can be installed, activated, maintained, and/or monitored in an automated and consistent manner across a network.

As used herein, the term "deterministically assign" and "deterministically reassign" refers to the assignment or reassignment of multicast groups and/or multicast group elements in a multicast-associated routing table or tree using an intent of the network administrator to meet a network operational objective or purpose, e.g., to improve network or network device efficiency or operation, engineer multicast traffic, derive and enforce site-specific or time-specific network policies, quarantine suspicious traffic, and combinations thereof. The assignment or reassignment does not involve use of non-deterministic method such mapping one group to another group based on a hash operator. In many classes of network device, MD5 hash of overlay (S,G) are used for mapping of SSM, and a hash of the overlay group address are used for ASM. The deterministic assignment and reassignment operations thus provide for the deterministic allocation of groups in managing the network. It also can provide for traffic engineering, including the enforcement of QOS policies for certain groups, as well as for quarantine operation, archive operation, bandwidth reservation, and ACLs, for a single site.

In an aspect, a system is disclosed comprising a processor; and a memory having instructions stored thereon, wherein execution of the instructions by the processor causes the processor to implement a map server/map resolver (MR-MS), the map server/map resolver being configured to deterministically assign underlay multicast group by receiving policies and/or parameterized intent of a network administrator from a controller (e.g., DNA-C or ISE); receiving, from a set of ingress and/or egress tunnel routers (e.g., LISP xTR) of a software defined network, requests for a group address for a given overlay multicast stream received at the set of ingress and/or egress tunnel routers (e.g., LISP xTR); deterministically determining an underlay multicast group for the given overlay multicast stream based on the received policies and/or parameterized intent; and transmitting the determined underlay multicast group for the given overlay multicast stream to the ingress and/or egress tunnel router.

In some embodiments, the map server/map resolver is configured to deterministically assign and reassign the underlay multicast group to perform at least one of reduce bandwidth or switch-gear hardware utilization; traffic engineer a single overlay (S, G); implement a site-specific policy; implement a time-do-day group assignment; quarantine suspicious traffic; and respond to host movement.

In some embodiments, the instructions to deterministically assign or reassign overlay multicast traffic (e.g., in a LISP network) includes determining whether the request includes a source address or does not include a source address, wherein inclusion of the source address indicates a source specific multicast (SSM) operation, and wherein non-inclusion of the source address indicates an any-source multicast (ASM) operation.

In some embodiments, the policies and/or parameterized intent of a network administrator includes at least one of an optimization priority policy or a set of parameters associated therewith (e.g., optimize for bandwidth over TCAM utilization); a multicast addressing scope or a set of parameters associated therewith (e.g., range of multicast addresses to be used for site-local, site-global flows and quarantined flows); a security associated policy or a set of parameters associated therewith (e.g., list of blacklisted sources, threshold limits for declaring a flow offending); a group switchover-based policy or a set of parameters associated therewith (e.g., rate information for group switchover); and a time-of-day-based policy or a set of parameters associated therewith.

In some embodiments, the set of ingress and/or egress tunnel routers comprises LISP xTR, wherein the instructions to deterministically assign or reassign overlay multicast traffic includes receiving (e.g., from an ingress tunnel router or an egress tunnel router) a join-interest message, wherein the join-interest message includes an endpoint identifier (EID) of a receiver and an overlay multicast (s,g) information of the interested receiver(s), and wherein the endpoint identifier and overlay multicast (s,g) information are used in the assignment and/or reassignment in accordance with the assignment and reassignment configuration.

In some embodiments, the join-interest message comprises a LISP extensible message.

In some embodiments, the LISP extensible message comprises a MAP-REGISTER message or a MAP-LOOKUP extendible message.

In some embodiments, the instructions to deterministically assign or reassign overlay multicast traffic, when executed by the processor, further cause the processor to cache the endpoint identifier (EID) of the receiver and the overlay multicast (s,g) information of the interested receiver(s), wherein the cached information is used for subsequent reassignments operation (e.g., based on mobility of receivers).

In some embodiments, the join-interest message includes source-active information (e.g., similar to that provided in BGP MVPN Rt-5).

In some embodiments, the instructions to deterministically assign or reassign the overlay multicast traffic further includes collating the tuple of information to generate a new underlay group G, wherein the tuple of information comprises information selected from the group consisting of one or more overlay g information; a set of receiver EIDs information; sender RLOC information; a set of receiver RLOCs information; state:: {Assigned, Recalculate} information; policy information; and current underlay G.

In some embodiments, the instructions to deterministically assign or reassign overlay multicast traffic further includes transmitting the determined underlay multicast group data to an xTR hosting a source of the determined underlay multicast group (e.g., all receiver and source sites; existing groups and/or modified group affected by the assignment and/or reassignment).

In some embodiments, the instructions to deterministically assign or reassign overlay multicast traffic is performed to aggregate multiple overlay Gs to a same underlay Gs if between same xTRs; and/or allocate separate underlay groups for better TE/bandwidth reservation.

In some embodiments, the instructions to deterministically assign or reassign overlay multicast traffic is performed to separate overlay Gs having separate aggregate multiple overlay Gs to same underlay Gs if the underlay Gs between a different set of xTRs; and/or configure changes for TE.

In some embodiments, the transmitted underlay multicast group is used to monitor signature of flows for quarantine of a flow.

In another aspect, a method is disclosed comprising: receiving, at a map server/map resolver controller of LISP network, policies and/or parameterized intent of a network administrator from a controller of the LISP network; receiving, at the map server/map resolver controller, from a set of ingress and/or egress tunnel routers (xTRs) of the LISP network, requests for a group address associated with a given overlay multicast stream defined by a multicast group in another network, wherein each request includes information selected from the group consisting of overlay g information; receiver EID information; sender RLOC information; receiver RLOCs information; state:: {Assigned, Recalculate} information; policy information; and current underlay G information; deterministically determining, at the map server/map resolver controller, an underlay multicast group comprising the set of ingress and/or egress tunnel routers or a portion thereof, for the given overlay multicast stream using the received policies and/or parameterized intent; and transmitting, from the map server/map resolver controller, to the set of ingress and/or egress tunnel routers, the determined underlay multicast group for the given overlay multicast stream.

In some embodiments, the step of deterministically determining the underlay multicast group comprises collating tuples of information in the request to generate a new underlay group G.

In some embodiments, the requests comprises a join-interest message comprises a LISP extensible message.

In some embodiments, the step of deterministically determining underlay multicast group comprises mapping an overlay multicast group native of another network to an underlay LISP-multicast group without use of a hash operator.

In some embodiments, the step of deterministically determining underlay multicast group comprises identifying overlay Gs of a second network having a same set of xTRs of the LISP network; and aggregating the identified overlay Gs to a same underlay Gs for any identified overlay Gs of the second network having the same set of xTRs.

In another aspect, a non-transitory computer readable medium having instructions stored thereon, wherein execution of the instructions by a processor, causes the processor to implement a map server-map resolver; receive assignment and reassignment configuration from a controller of a first network; receive, from egress and ingress tunnel routers in the first network, requests for a group address for a given overlay multicast stream, wherein the overlay multicast stream is associated with a multicast group natively defined in a second network; deterministically determine an underlay multicast group for the given overlay multicast stream using the received assignment and reassignment configuration; and transmit the determined underlay multicast group for the given overlay multicast stream to the tunnel router.

Example Network

FIG. 1 is a diagram of an example network 100 comprising a map server/map resolver configured to deterministically assign and reassign overlay multicast traffic in accordance with an illustrative embodiment. Specifically, FIG. 1 shows the network 100 having LISP-related network devices for the purpose of demonstrating the assignment and reassignment operation. It is contemplated that implementations in Locator Identifier Separation Protocol (LISP) networks are merely one set of examples of this technology which may apply assignment, and/or reassignment, of underlay multicast traffic in other software-defined access (SDA) and/or software-defined network (SDN) implementations.

In FIG. 1, an ingress/egress tunnel router ("xTR") 108 (shown as 108a and 108b) can receive a source-specific-multicast (SSM) traffic 110 (shown as "(S,G)" 110) or any-source multicast (ASM) traffic 112 (shown as "(*,G)" 112) sent from a multicast source 114 to a set of underlay multicast groups 116 (e.g., shown as group "G1" 116a, group "G2" 116b, and group "G3" 116c) in which each groups include a set of one or more receivers.

In FIG. 1, the network 100 include at least one LISP site 102 (shown as 102a), a non-LISP site 104, and map server-map resolver ("MSMR") controller 106 configured to deterministically and centrally assign, and reassign, underlay multicast group(s) for overlay multicast traffic. The map server-map resolver ("MSMR") controller 106 serves as a centralized controller: receiving group join request from tunnel or boundary routers (xTRs); receiving policies (or generating policies) from network administrators; and pushing notifications to the xTRs to change underlay groups once assignment or reassignment are determined.

The map server-map resolver controllers 106 may use routing locators (RLOCs) and endpoint identifiers (EID) for identifying network sessions between devices in which devices in the SDN (e.g., LISP) sites 102 has an EID namespace, and devices in the other network (e.g., non-LISP site) 104 has a RLOC namespace. Indeed, the LISP EID namespace may represent customer-end sites in the same, or similar, way that end sites are defined in non-LISP environments with one difference: the IP addresses used within the LISP sites are not advertised within the non-LISP Internet (RLOC namespace). Rather, customer endpoint routers are configured to perform both the egress tunnel router (ETR) and ingress tunnel router (ITR) functions of a LISP device (ETR and ITR are referred to as xTR).

Per FIG. 1, the LISP infrastructure may additionally include a proxy egress tunnel router (PETR), a proxy ingress tunnel router (PITR), and/or a LISP alternative logical topology (ALT) device. The map server-map resolver controller 106 as discussed herein may be implemented with one or more servers or network devices. LISP multicast allows source multicast sites and receiver multicast sites to send and receive multicast packets over a unicast RLOC core and keeps the EID state out of the core network. LISP multicast may be implemented using a unicast headend replication or multicast replication mode. In unicast headend replication mode, multicast is implemented in LISP sites, but not implemented in the core network, or exploited if deployed. For example, if an ingress tunnel router (ITR) receives a multicast packet from a LISP site and needs to forward the multicast packet to multiple other LISP sites, the ITR needs to replicate multicast packets for each receiving LISP site and encapsulate the multicast packet within a header with a unicast destination. In conventional LISP multicast networks using unicast headend replication with PIM-SSM (Protocol Independent Multicast-Source Specific Multicast) mode, multicast traffic is dropped in the period starting when a source host moves between LISP sites, through the map cache entries being updated at xTRs connecting the receiving LISP sites, and the resulting control plane PIM join updates to the source host's new home.

Map Server-Map Resolver

Figure 2:
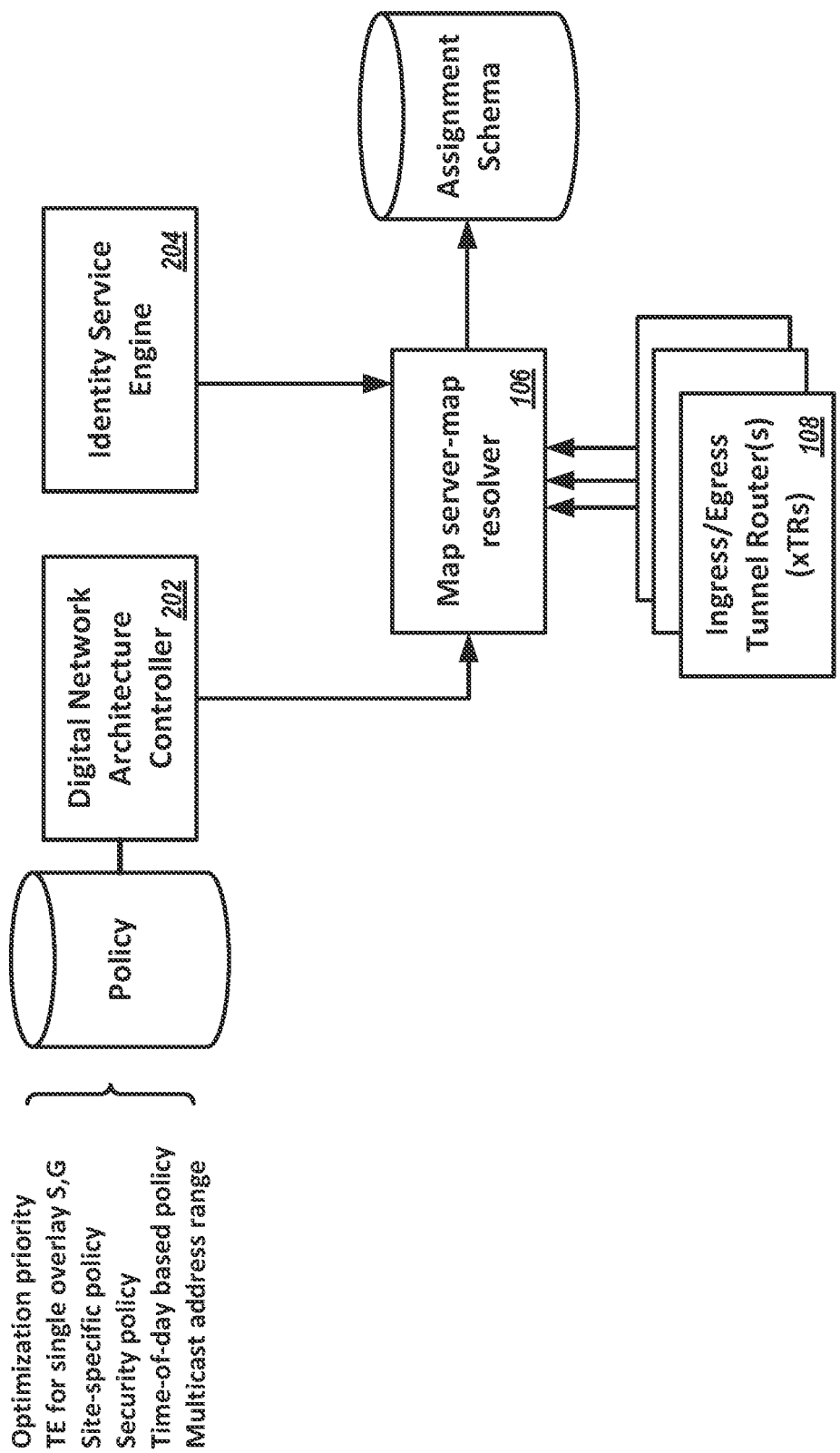
FIG. 2 shows an example centralized network controller comprising a map server-map resolver (MSMR) controller in a LISP network in accordance with an illustrative embodiment.
Figure 3:
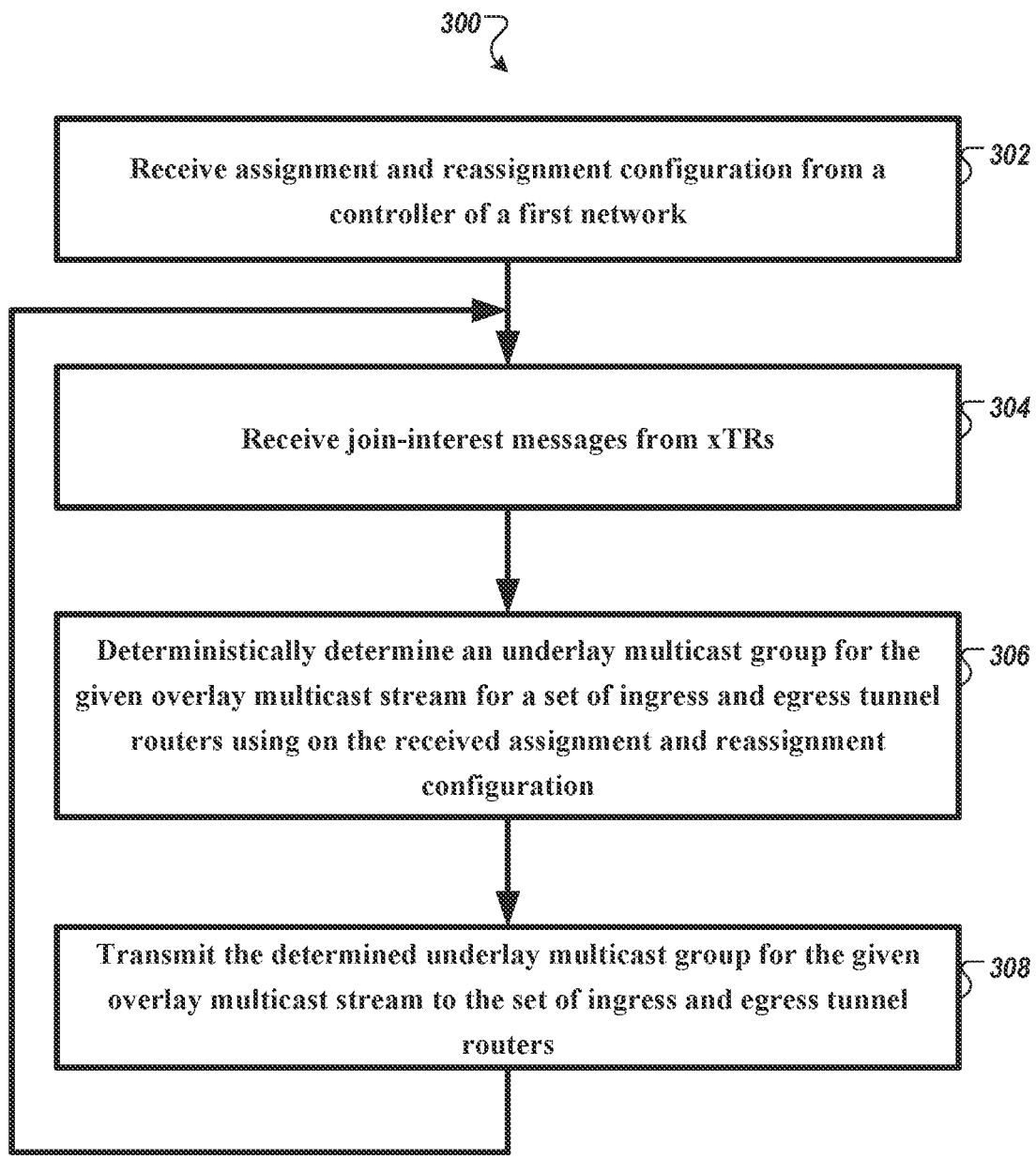
FIG. 3 shows an example method of deterministically assigning, using the map server-map resolver (MSMR) controller of FIG. 2, overlay multicast group natively defined in a network to an underlay multicast group of a LISP network in accordance with an illustrative embodiment.

FIG. 2 shows an example centralized network controller comprising a map server-map resolver (MSMR) controller in a LISP network in accordance with an illustrative embodiment. FIG. 3 shows an example method 300 of deterministically assigning overlay multicast group (native) associated with an external network to an underlay multicast group (e.g., of a LISP network) in accordance with an illustrative embodiment.

In FIG. 2, the map server-map resolver (MSMR) controller 106 is shown operating in conjunction with a Digital Network Architecture (DNA) controller 202 and Identity Services Engine (ISE) 204 in a LISP network. The MSMR controller 106 is configured to assign underlay multicast group(s) for a given overlay multicast stream. In some embodiments, the LISP protocol is extended to have the xTRs (e.g., 108) query the MSMR controller 106 for the underlay group addresses. For SSM, xTRs can request a group address (underlay) for specific overlay (S,G). For ASM, overlay group address can be used to request the underlay group address. The MSMR can also actively push notifications down to xTRs to change underlay groups. Indeed, the MSMR controller 106 is configured to map the native multicast traffic (e.g., of an external network) to an underlay group (e.g., of a LISP network).

As shown in FIG. 2, in some embodiments, the Digital Network Architecture (DNA) controller 202 is configured to obtain the network operator's intent to which the map server-map resolver (MSMR) controller 106 may receive (shown in 302) and implement the obtained network operator's intents in a requests or as a set of user tunable parameters.

Examples of user tunable parameters may include, but not limited to preferred optimization priority (e.g. optimize for bandwidth over TCAM utilization), multicast addressing scope (range of multicast addresses to be used for site-local, site-global flows and quarantined flows), policy information about security (e.g., list of blacklisted sources, threshold limits for declaring a flow offending), rate information for group switchover, policy information about other methods like time-of-day based group assignment, among others.

The MSMR controller 106 is configured to receive (shown in 304) join-interest messages from xTRs hosting the receivers (e.g., of the LISP network). A join-interest message may include/report the join information for each xTR. The join-interest message, in some embodiments, includes the EID of the receiver and the overlay multicast (s,g) information of the interested receiver(s). The MSMR controller 106 may use the information in the message to identify and/or select group address, e.g., based on the site-scope and policies of the receivers. The receiver information could also be cached for future re-assignments based on mobility of receivers. In some embodiments, the MSMR controller 106 is additionally configured to Source-Active (e.g., similar to the BGP MVPN Rt-5) information. The source information could be cached for future re-assignments based on mobility. In some embodiments, the join-interest message is configured as an extended LISP protocol message. The extended LISP protocol messages may be based on a map-register message or a map-notify message. Map register messages are typically sent by an ETR to a map server to register its associated ED-prefixes. Map notify messages are typically sent by an ETR to confirm that a Map-Register has been received and processed. The extended LISP protocol messages, in some embodiments, further includes an indication to assign, or reassign, the xTR to a group.

For SSM multicast traffic, xTRs 110 can request an underlay group address for specific overlay (S,G). That is, receivers only receives multicast packets originating from a specific source address requested by the receiver. For any source multicast (ASM) overlay, group addresses can be used to request the underlay group address. Any-source multicast allows a host computer to map IPs and then sends IPs to a number of groups via IP address, thereby facilitating transmission from hosts to groups without any restriction on the location of end-user computers.

The MSMR controller 106 is configured to collate (shown in 306), e.g., information received from the join-interest messages and source-active information to determine an Assignment schema for a new underlay G. In some embodiments, the determination is based on the tuple of <overlay s, overlay g, set of receiver EIDs, sender RLOC, set of (receiver RLOCs), state:: {Assigned, Recalculate}, policy, current underlay G (can be 0 for the first assignment)>. That is, the MSMR controller 106 may deterministically determine an underlay multicast group for the given overlay multicast stream for a set of xTRs using on the received assignment and reassignment configuration.

The MSMR controller 106 is configured to inform (shown in 308) all the involved xTR hosting the source about the new group and to switchover if an assignment or reassignment of the underlay group happens. That is, the MSMR controller 106 is configured to transmit the determined underlay multicast group for the given overlay multicast stream to the xTRs.

The map server-map resolver ("MSMR") controller 106 is a network device configured to operate as both a map server and a map resolver in the context of a LISP network. In performing map server (MS) operation, the MSMR is configured to receive map-registration messages from LISP sites. It may also address map-requests from a mapping database seeking mapping resolutions for EID prefixes and forwards them to a registered ETR that is authoritative for the EID prefix being queried. In performing map resolver (MR) operation, the MSMR is configured to receives map requests from ITRs and forwards them to the mapping database. The MSMR may also reply to queries for non-LISP addresses by sending negative map replies to ITRs.

Although the example provided in FIG. 2 is described in relation to a LISP network, it should be appreciated that similar controllers may be implemented in other types of software-defined network and software-access network.

Policy-Based Group-Assignment or Re-Assignment
Example #1

Figure 4:
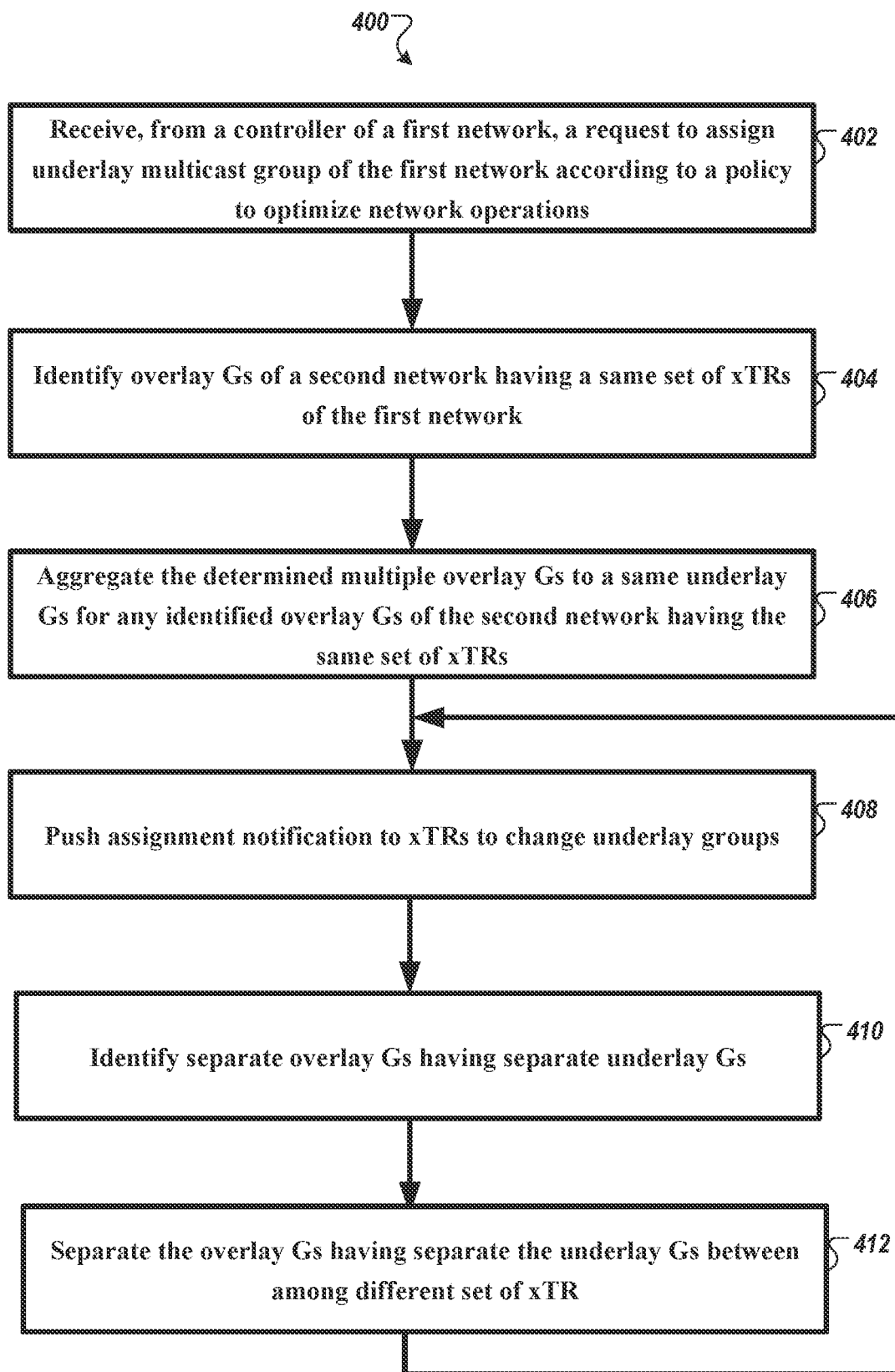
FIG. 4 show an example method to deterministically assign and reassign underlay multicast group according to a policy configured to optimize network operation in accordance with an illustrative embodiment.

FIG. 4 show an example method 400 to deterministically assign and reassign underlay multicast group according to a policy configured to optimize network operation in accordance with an illustrative embodiment. Examples of such optimizations include, but are not limited to, a policy to improve link bandwidth utilization or to improve TCAM utilization. In some embodiments, the operation to improve link bandwidth utilization may entail measuring wasted link bandwidth. An example policy would be to map a list of overlay S,G streams to a same underlay group irrespective of receiver set (receiver xTRs). In such example, the receiver xTRs could pull unnecessary traffic. Alternately, the MSMR can perform a computation to determine which streams have a common receiver set (receiver xTRs) and aggregate them.

Referring to FIG. 4, the method 400 includes receiving (step 402), from a controller (e.g., 202) of a first network (e.g., LISP network), a request to assign underlay multicast group of the first network (e.g., LISP network) according to a policy to optimize network operations.

The method 400 includes, at step 404, retrieving (e.g., by the MSMR) overlay Gs of the second network and corresponding xTRs of the first network (e.g., LISP network) and identifying overlay Gs of a second network having a common, or same, set of xTRs of the first network. The method 400 further includes, at step 406, aggregating the identified overlay Gs having the common, or same, set of xTRs. In some embodiments, the aggregation may be based on the xTR allocated assignment. In other embodiment, the aggregation may be applied to the xTR having the most overlay Gs. Indeed, steps 404 and 406 facilitate the aggregation of multiple overlay Gs to a single, or reduced set of, same underlay Gs if the multiple overlay Gs exists among a same set of xTRs. Such assignment can save TCAM space as the number of underlay groups and/or associated recipients/xTRs can be reduced.

The method 400 further includes pushing (step 408) assignment notification to xTRs to change underlay groups. In some embodiments, the MSMR pushes the assignment notification to the xTRs. In other embodiments, the MSMR pushes the assignment notification to a database that is periodically messaged by the xTRs. In some embodiments, the MSMR send a notification to the controller (e.g., 202) that request to assign underlay multicast group according to the provided policy has been completed. In some embodiments, the MSMR send a notification to a log maintained by the controller.

In some embodiments, the MSMR is configured to continue to deterministically reassign underlay multicast group according to the received policy to optimize network operations. To reassign the underlay multicast group, the method 400 further includes, in step 410, the MSMR (e.g., 106) retrieving overlay Gs of the second network (e.g., external network), underlay Gs of the first network (e.g., LISP network), and corresponding xTRs of the first network (e.g., LISP network) and identifying overlay Gs having separate underlay Gs among the different sets of xTRs. Upon a match, the MSMR, in step 412, may separate the overlay Gs having the separate underlay Gs for a given xTR. Such reassignment can save link bandwidth and make the traffic more secure as receivers listed in the underlay Gs that not recipient to the multicast traffic can be removed from the list.

Policy-Based Group-Assignment or Re-Assignment
Example #2

Figure 5:
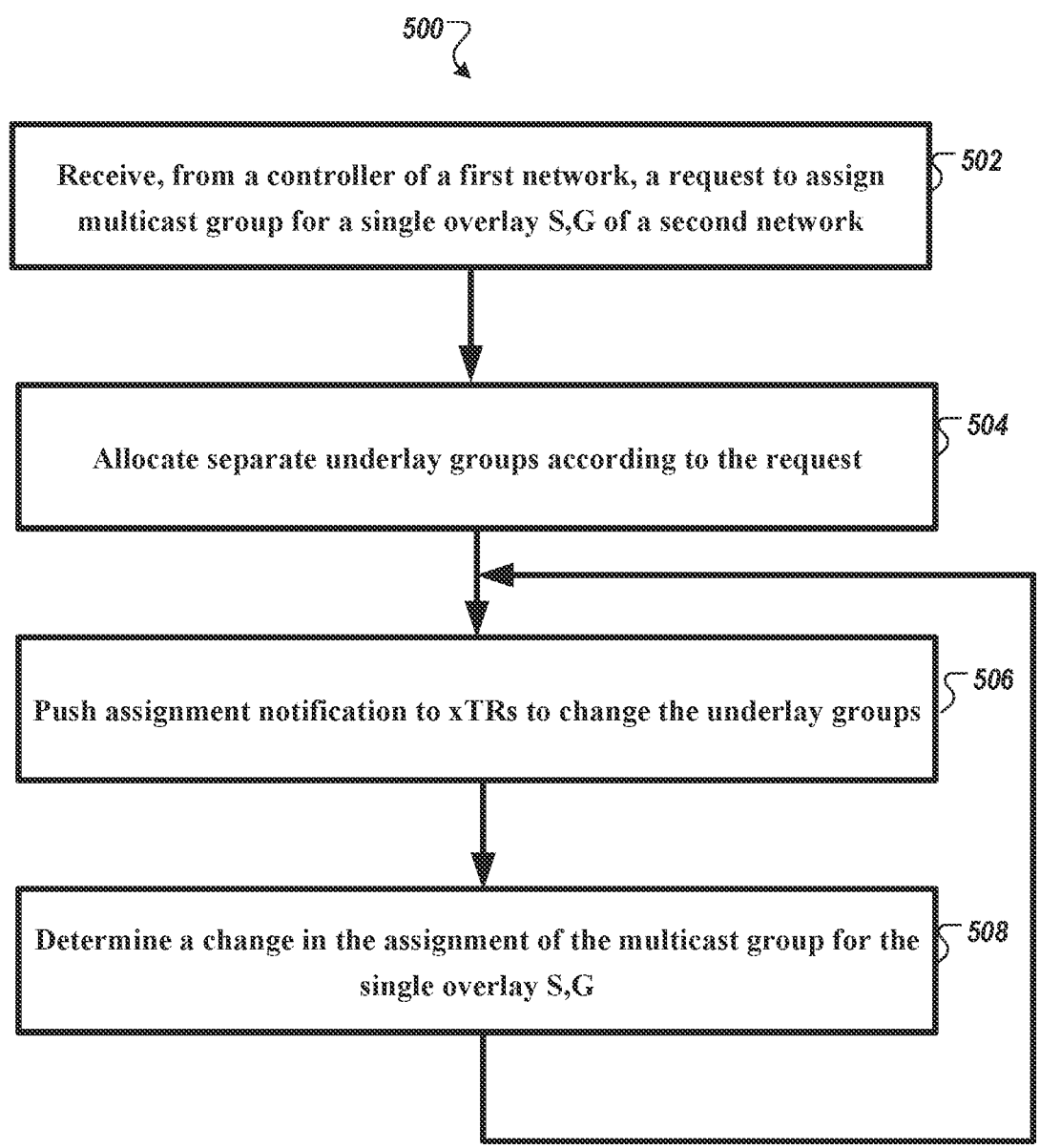
FIG. 5 show another example method to deterministically assign and reassign underlay multicast group according to a policy in accordance with an illustrative embodiment.

FIG. 5 show another example method 500 to deterministically assign and reassign underlay multicast group according to a policy in accordance with an illustrative embodiment. In method 500, the example is shown to assign multicast group for a single overlay S,G of a second network (e.g., external network). Examples of such policies/action facilitate traffic engineering (TE) for a single overlay S,G. Such functionality is generally not available in signal free LISP underlay. The traffic engineering may be to improve bandwidth reservation. In some embodiments, the traffic engineering operation facilitates the reconfiguring of the network in response to changing traffic loads to achieve some operational goals, such as traffic ratios in a peering relationship (e.g., "peering ratios"), relieve congestion, balance and rebalance load, etc.

The method 500 includes receiving (step 502), from a controller (e.g., 202) of a first network (e.g., LISP network), a request to assign underlay multicast group of the first network (e.g., LISP network) to at least one single overlay S,G of a second network (e.g., external network).

The method 500 includes, at step 504, allocate separate underlay groups according to the request. The method 500 further includes pushing (step 506) assignment notification to xTRs to change underlay groups. In some embodiments, the MSMR pushes the assignment notification to the xTRs. In other embodiments, the MSMR pushes the assignment notification to a database that is periodically messaged by the xTRs. In some embodiments, the MSMR send a notification to the controller (e.g., 202) that request to assign the underlay multicast group according to traffic engineered for the single overlay S,G of the second network has been completed. In some embodiments, the controller (e.g. 202) logs the notification. Indeed, steps 502, 504, and 506 facilitate the deterministically assignment of underlay multicast group (e.g., in a LISP network) to traffic engineer for a single overlay S,G (of an external network).

In some embodiments, the MSMR is configured to continue to deterministically reassign underlay multicast groups. To reassign the underlay multicast group, the method 500 further includes, in step 508, the MSMR (e.g., 106) determining a change in the assignment of the multicast group for the single overlay S,G and pushing (e.g., 506) the reassignment notification to configuration changes for the traffic engineering operation.

Policy-Based Group-Assignment or Re-Assignment
Example #3

Figure 6:
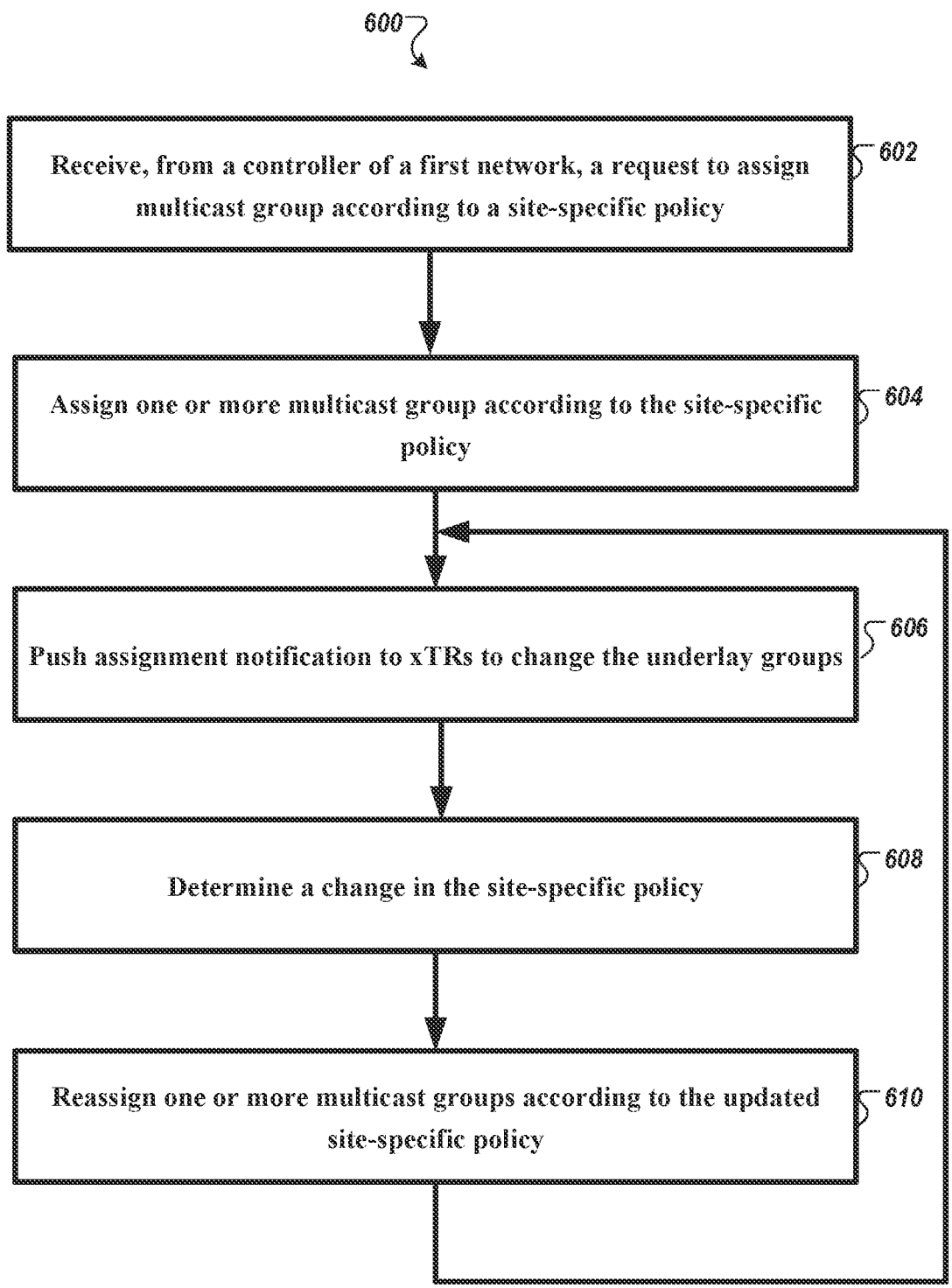
FIG. 6 show another example method to deterministically assign and reassign underlay multicast group according to a site-specific policy in accordance with an illustrative embodiment.

FIG. 6 show another example method 600 to deterministically assign and reassign underlay multicast group according to a site-specific policy in accordance with an illustrative embodiment. For example, a site-specific policy may involve direct multicast traffic for a given source or network to specific multicast boundaries.

The method 600 includes receiving (step 602), from a controller (e.g., 202) of a first network (e.g., LISP network), a request to assign underlay multicast group of the first network (e.g., LISP network) according to a site-specific policy. In the example of multicast boundary site-specific policy, the policy may define that only certain xTRs may participate in certain underlay groups.

The method 600 includes, at step 604, assign one or more multicast group according to the provided site-specific policy. In the example of multicast boundary site-specific policy, the MSMR may assign the defined xTR for a given underlay group.

The method 600 further includes pushing (step 606) assignment notification to xTRs to change underlay groups. In some embodiments, the MSMR pushes the assignment notification to the xTRs. In other embodiments, the MSMR pushes the assignment notification to a database that is periodically messaged by the xTRs. In some embodiments, the MSMR send a notification to the controller (e.g., 202) that request to assign the underlay multicast group according to a site-specific policy has been completed. In some embodiments, the controller (e.g. 202) logs the notification. Indeed, steps 602, 604, and 606 facilitate the deterministically assignment of underlay multicast group (e.g., in a LISP network) according to a site-specific policy, e.g., provided by, and/or defined in, the controller (e.g., 202).

In some embodiments, the MSMR is configured to continue to deterministically reassign underlay multicast group.

To reassign the underlay multicast group, the method 600 further includes, in step 608, the MSMR (e.g., 106) determining (step 608) a change in the site-specific policy and reassigning (step 610) one or more multicast group according to the updated site-specific policy and pushing (e.g., 606) the reassignment notification.

Policy-Based Group-Assignment or Re-Assignment
Example #4

Figure 7:
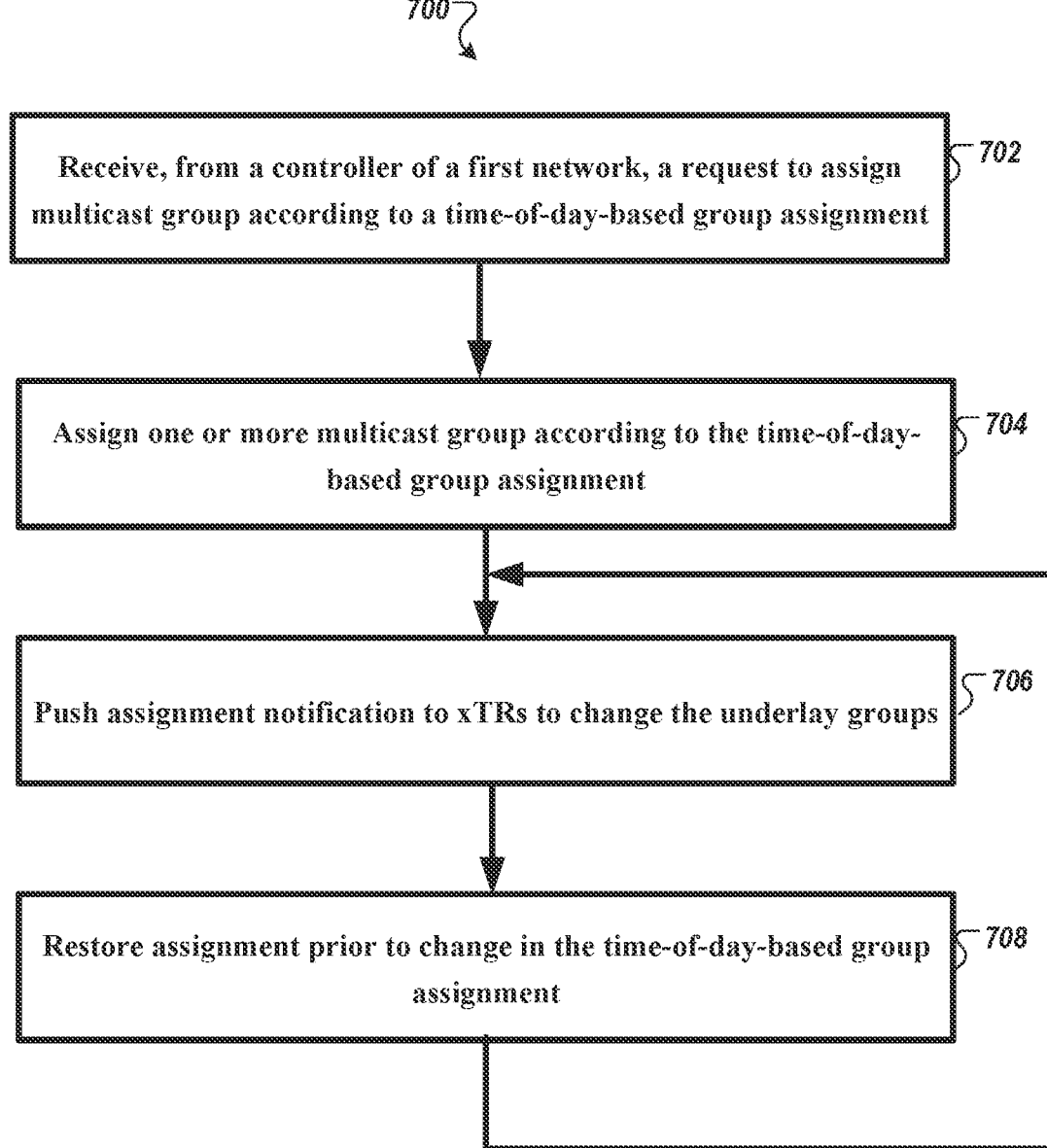
FIG. 7 show another example method to deterministically assign and reassign underlay multicast group according to a time-of-day-based group assignment policy in accordance with an illustrative embodiment.

FIG. 7 show another example method 700 to deterministically assign and reassign underlay multicast group according to a time-of-day-based group assignment policy in accordance with an illustrative embodiment. Indeed, the time-of-day based group assignment policy may apply any of the policies discussed herein based on time, e.g., site-specific policy, multicast group ranges. In some embodiments, the time-of-day based group assignment policy may be specified for certain in a given week. In some embodiments, the time-of-day based group assignment policy may be specified for certain time in a given day in the month. In some embodiments, the time-of-day based group assignment policy may be specified for certain time in a given day in the month. The specific time may an additional parameter to any of the policies.

The method 700 includes receiving (step 702), from a controller (e.g., 202) of a first network (e.g., LISP network), a request to assign underlay multicast group of the first network (e.g., LISP network) according to a time-of-day-based group assignment policy.

The method 700 includes, at step 704, assigning one or more multicast group according to the provided policy for a given specific date or time.

The method 700 further includes pushing (step 706) assignment notification to xTRs to change underlay groups. In some embodiments, the MSMR pushes the assignment notification to the xTRs. In other embodiments, the MSMR pushes the assignment notification to a database that is periodically messaged by the xTRs. In some embodiments, the MSMR send a notification to the controller (e.g., 202) that request to assign the underlay multicast group according to a site-specific policy has been completed. In some embodiments, the controller (e.g. 202) logs the notification. Indeed, steps 702, 704, and 706 facilitate the deterministically assignment of underlay multicast group (e.g., in a LISP network) according to a time-of-day-based group assignment policy, e.g., provided by, and/or defined in, the controller (e.g., 202).

In some embodiments, the MSMR is configured to continue to deterministically reassign underlay multicast group. To reassign the underlay multicast group, the method 700 further includes, in step 708, the MSMR (e.g., 106) restores (step 708) the network assignment prior to the change in the time-of-day-based group assignment being effected.

Policy-Based Group-Assignment or Re-Assignment
Example #5

Figure 8:
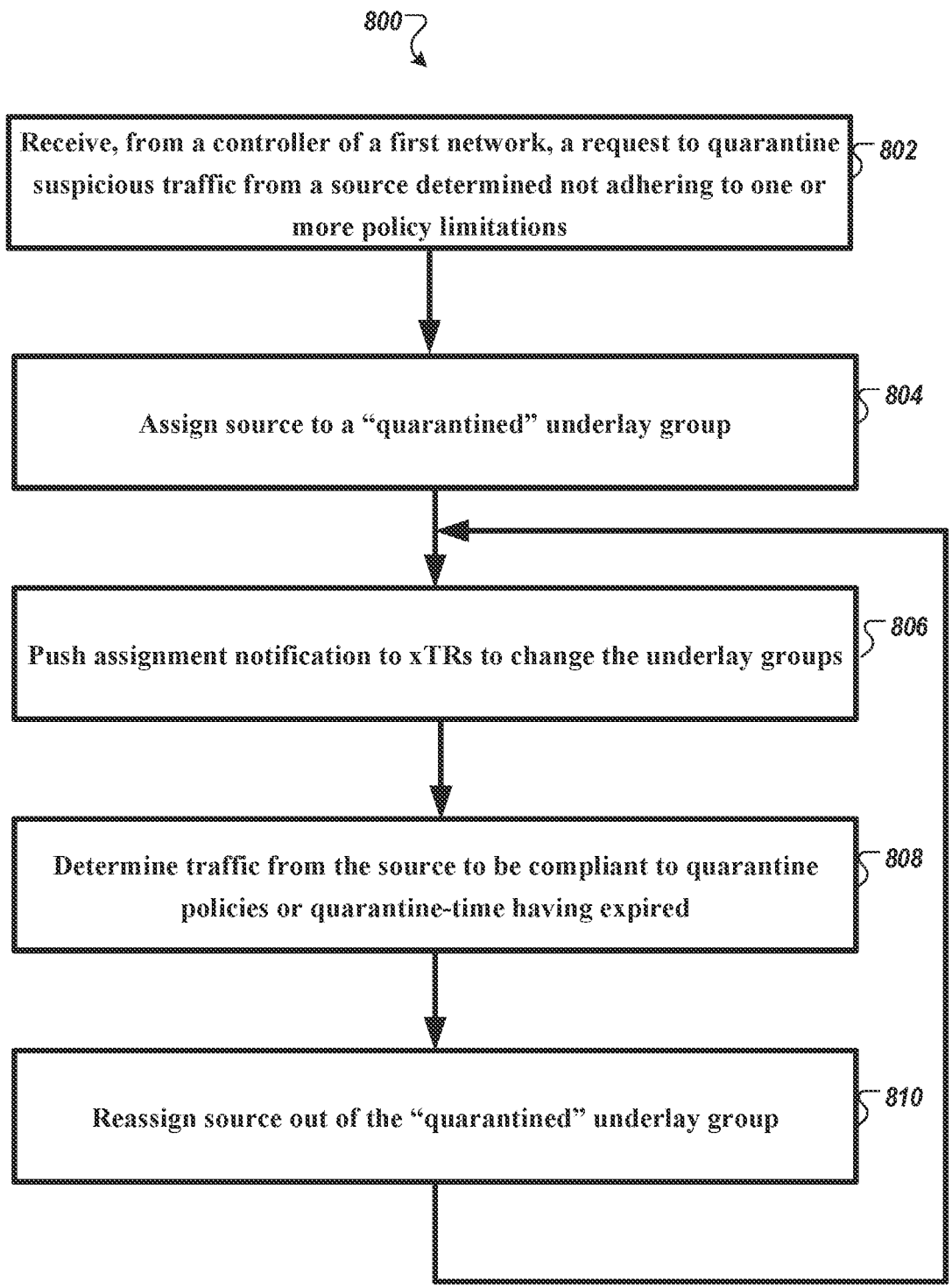
FIG. 8 show another example method to deterministically assign and reassign underlay multicast group according to a security policy in accordance with an illustrative embodiment.

FIG. 8 show another example method 800 to deterministically assign and reassign underlay multicast group according to a security policy in accordance with an illustrative embodiment. For example, a security policy may involve quarantining suspicious traffic from a source determined not to be adhering to one or more policy limitations.

The method 800 includes receiving (step 802), from a controller (e.g., 202) of a first network (e.g., LISP network), a request to assign a source (e.g., of a second network) to a "quarantined" underlay group. A "quarantined" underlay group may include receivers configured to run enhanced security protocols or deep packet inspection. In some embodiments, the "quarantined" underlay group may include a receiver configured to merely store a suspicious traffic associated with the quarantined source. In some embodiments, the Identity Services Engine (ISE) 204 may be configured to monitor the signature of flows (e.g., parameters such as packet size, ETA results) and quarantine a flow. Upon a match, the Identity Services Engine (ISE) 204 may signal the controller (e.g., 204) to generate the request (associated with step 802) to quarantine such flow and associated source.

The method 800 includes, at step 804, assigning a given source to the "quarantined" underlay group for a specific period of time. In some embodiments, the time may be specified by the network administrator. In some embodiments, the receivers of the "quarantined" underlay group are configured to maintain received traffic until the network administrator provides a release command.

The method 800 further includes pushing (step 806) assignment notification to xTRs to change underlay groups. In some embodiments, the MSMR pushes the assignment notification to the xTRs. In other embodiments, the MSMR pushes the assignment notification to a database that is periodically messaged by the xTRs. In some embodiments, the MSMR send a notification to the controller (e.g., 202) that request to assign the underlay multicast group according to a site-specific policy has been completed. In some embodiments, the controller (e.g. 202) logs the notification. Indeed, steps 802, 804, and 806 facilitate the deterministically assignment of suspicious traffic and/or source to securable/quarantined underlay multicast group (e.g., in a LISP network).

In some embodiments, the MSMR is configured to deterministically reassign source assigned to a "quarantined" underlay multicast group by re-assigning the source to another group after a certain time has passed or release action has occurred.

Policy-Based Group-Assignment or Re-Assignment
Example #6

Figure 9:
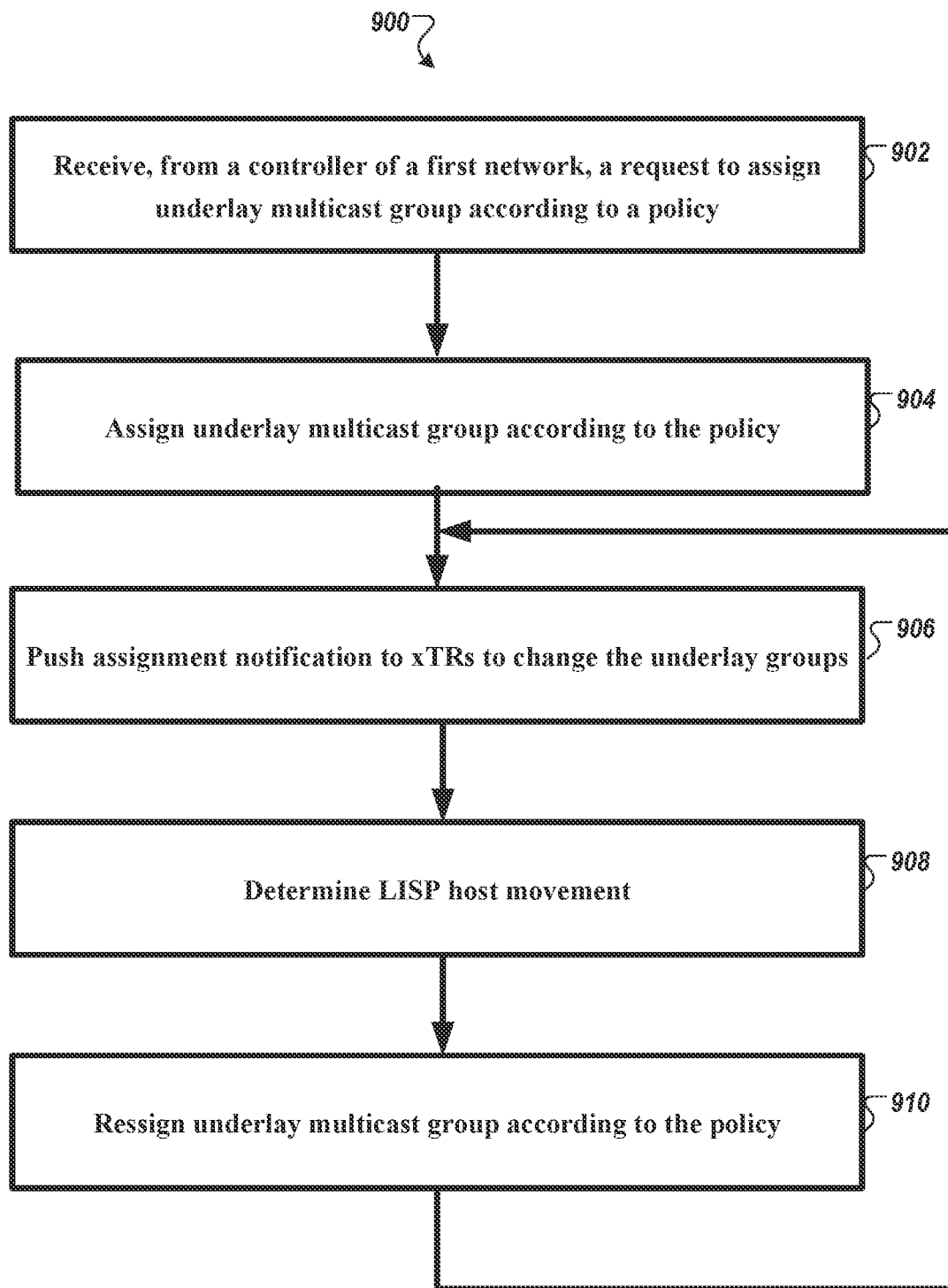
FIG. 9 show another example method to deterministically assign and reassign underlay multicast group according to a policy, e.g., in response to a host movement (e.g., LISP host movement) in accordance with an illustrative embodiment.

FIG. 9 show another example method 900 to deterministically assign and reassign underlay multicast group according to a policy, e.g., in response to a host movement (e.g., LISP host movement) in accordance with an illustrative embodiment. Hosts may include sources or receivers.

The method 900 includes receiving (step 902), from a controller (e.g., 202) of a first network (e.g., LISP network), a request to assign an underlay multicast group according to a policy in response to a host movement.

The method 900 includes, at step 904, assigning underlay multicast group according to the policy provided in the request.

The method 900 further includes pushing (step 906) assignment notification to xTRs to change underlay groups. In some embodiments, the MSMR pushes the assignment notification to the xTRs. In other embodiments, the MSMR pushes the assignment notification to a database that is periodically messaged by the xTRs. In some embodiments, the MSMR send a notification to the controller (e.g., 202) that request to assign the underlay multicast group according to a site-specific policy has been completed. In some embodiments, the controller (e.g. 202) logs the notification. Indeed, steps 902, 904, and 906 facilitate the deterministically assignment of an underlay multicast group according to a policy in response to a host movement.

In some embodiments, the MSMR is configured to continue to deterministically reassign underlay multicast group. To reassign the underlay multicast group, the method 900 further includes, in step 908, the MSMR (e.g., 106) determining, or receiving notification, of a host movement (e.g., LISP host movement). To reassign the underlay multicast group, the method 900 further includes, in step 910, the MSMR (e.g., 106) one or more multicast group according to the host movement (e.g., LISP host movement) and pushing (e.g., 906) the reassignment notification.

Discussion

The exemplary method and system provides for deterministic assignment/mapping of overlay multicast group and associated to flow native to a network to an underlay multicast group based on policies and parameterized intent. Conventional implementations for such mapping generally involve a hash operation. Network standard only requires the same mapping to be present on all xTRs but does not necessarily specify how the mapping is derived.

RFC6831, e.g., discloses the use of a mapping database to map overlay to underlay. Specifically, Section 4 of RFC6831 discloses that a large number of <S-EID, G> flows may be mapped to a few <S-RLOC, G> flows but lacks disclosure of method to address sub-optimal bandwidth utilization when doing so. The exemplary method and system employs a central entity and associated framework to map/remap overlay flows to a specific underlay flow to address such sub-optimal bandwidth utilization.

In addition, RFC8378 discloses multicast connectivity using unicast replication. The exemplary method and system provide for the binding between overlay and underlay multicast groups with mechanisms to apply policy to derive such bindings. For example, simplistically the underlay multicast group could be arithmetically derived from the overlay <s, g>. Alternately, it can be derived by looking at multiple parameters as described herein. Once an underlay group is derived, the exemplary method and system makes it is easier to enforce policy for a single underlay multicast group rather than a group of RLOCs as covered by RFC8378.

The exemplary method and system further facilitate the application of differentiated treatment at the core nodes for multicast versus unicast packets. RFC8378 does not provide for the use of policies to handle unicast payloads versus multicast payloads.

The exemplary method and system further provides dynamic remapping of bindings to address the quarantining suspicious traffic or rate-based grouping of overlay streams; operations not provided in RFC8378.

The exemplary method and system also distinguishes from Overlay Transport Virtualization (OTV) solutions which does not use policy in deriving the underlay-overlay mapping. In OTV, the mapping is generally delivered by the source site without consideration of the receiver side policies or constraints.

Indeed, the exemplary method and system disclosed herein may be beneficially used for the deterministic allocation of groups to assist in the managing network, facilitate traffic engineering, providing QOS operation for certain groups, quarantining, archiving, bandwidth reservation, ACLs, among others. The exemplary method and system disclosed herein may be beneficially used for Live-live Multicast streams distribution in the underlay, e.g., for premium traffic. The exemplary method and system disclosed herein may be beneficially used to avoid/reduce re-encapsulation, e.g., by allocating same group across sites in LISP multisite. The exemplary method and system disclosed herein may be beneficially used to provide ECMP-like paths by mapping the same overlay SG to different underlay Group addresses. The exemplary method and system disclosed herein may be beneficially used to provide different address family encapsulation (e.g., IPv4 to Ipv6, and vice-versa) among different LISP sites with different capabilities for the same stream. The exemplary method and system disclosed herein may be beneficially used to provide different policies for the same stream in different sites in LISP multisite. The exemplary method and system disclosed herein may be beneficially used to provide use-cases similar to Data MDT in mvpn in switching underlay groups on the fly. The exemplary method and system disclosed herein may be beneficially used to avoid or reduce the need for exact underlay group range configuration on all XTRs which could be error prone.

It is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Embodiments of the network device (e.g., 100) may be implemented, in whole or in part, in virtualized network hardware in addition to physical hardware. It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

What is claimed is:

1. A system comprising:

a processor; and a memory having instructions stored thereon, wherein execution of the instructions by the processor causes the processor to:

implement a map server/map resolver (MR-MS);

receive policies and/or parameterized intent of a network administrator from a controller of a first network;

receive, from a set of ingress and/or egress tunnel routers of the first network, requests for a group address for a given overlay multicast stream defined by a multicast group in a second network;

deterministically determine an underlay multicast group comprising the set of ingress and/or egress tunnel routers or a portion thereof, for the given overlay multicast stream using the received policies and/or parameterized intent; and transmit the determined underlay multicast group for the given overlay multicast stream to the set of ingress and/or egress tunnel routers wherein the step of deterministically determining the underlay multicast group comprises collating tuples of information in the requests to generate a new underlay group G.

2. The system of claim 1, wherein the map server/map resolver is configured to deterministically assign and reassign the underlay multicast group to perform at least one of:
reduce bandwidth or switch-gear hardware utilization;
traffic engineer a single overlay (S, G);
implement a site-specific policy;
implement a time-do-day group assignment;
quarantine suspicious traffic; and
respond to host movement.

3. The system of claim 2, wherein the instructions to deterministically assign or reassign overlay multicast traffic includes determining whether the request includes a source address or does not include a source address, wherein inclusion of the source address indicates a source specific multicast (SSM) operation, and wherein non-inclusion of the source address indicates an any-source multicast (ASM) operation.

4. The system of claim 1, wherein the policies and/or parameterized intent of a network administrator includes a policy selected from the group consisting of:
an optimization priority policy or a set of parameters associated therewith;
a policy defined by multicast address range or a set of parameters associated therewith;
a security associated policy or a set of parameters associated therewith;
a group switchover-based policy or a set of parameters associated therewith; and
a time-of-day-based policy or a set of parameters associated therewith.

5. The system of claim 1, wherein the set of ingress and/or egress tunnel routers comprises LISP xTR, and wherein the instructions to deterministically assign or reassign overlay multicast traffic include:
receiving, from an ingress tunnel router or an egress tunnel router, a join-interest message, wherein the join-interest message includes an endpoint identifier (EID) of a receiver and an overlay multicast (s,g) information of the interested receiver(s),
wherein the endpoint identifier and the overlay multicast (s,g) information are used in the assignment and/or reassignment in accordance with the assignment and reassignment configuration.

6. The system of claim 5, wherein the join-interest message comprises a LISP extensible message.

7. The system of claim 6, wherein the LISP extensible message comprises a MAP-REGISTER message or a MAP-LOOKUP extendible message.

8. The system of claim 5, wherein the instructions to deterministically assign or reassign overlay multicast traffic, when executed by the processor, further cause the processor to
cache the endpoint identifier (EID) of the receiver and the overlay multicast (s,g) information of the interested receiver(s), wherein the cached information is used for subsequent reassignments operation.

9. The system of claim 5, wherein the join-interest message includes source-active information.

10. The system of claim 5, wherein the instructions to deterministically assign or reassign overlay multicast traffic, when executed by the processor, further cause the processor to:
collate the tuple of information to generate a new underlay group G, wherein the tuple of information include information selected from the group consisting of overlay g information; a set of receiver EIDs information; sender RLOC information; a set of receiver RLOCs information; state:: {Assigned, Recalculate} information; policy information; and current underlay G.

11. The system of claim 5, wherein the instructions to deterministically assign or reassign overlay multicast traffic, when executed by the processor, further cause the processor to:
transmit the determined underlay multicast group data to an xTR hosting a source of the determined underlay multicast group.

12. The system of claim 11, wherein the transmitted underlay multicast group is used to monitor signature of flows for quarantine of a flow.

13. The system of claim 1, wherein the instructions to deterministically assign or reassign overlay multicast traffic is performed to:
separate overlay Gs having separate aggregate multiple overlay Gs to same underlay Gs if the underlay Gs between a different set of xTRs; and/or
configure changes for traffic engineering.

14. The system of claim 1, wherein the instructions to deterministically assign or reassign overlay multicast traffic is performed to:
aggregate multiple overlay Gs to a same underlay Gs if between same xTRs; and/or
allocate separate underlay groups for traffic engineering operations and/or bandwidth reservation.

15. A method comprising:
receiving, at a map server/map resolver controller of a Locator Identifier Separation Protocol (LISP) network, policies and/or parameterized intent of a network administrator from a controller of the LISP network;
receiving, at the map server/map resolver controller, from a set of ingress and/or egress tunnel routers (xTRs) of the LISP network, requests for a group address associated with a given overlay multicast stream defined by a multicast group in another network, wherein each request includes information selected from the group consisting of overlay g information; receiver endpoint identifier (EID) information; sender routing locators (RLOC) information; receiver RLOCs information; state:: {Assigned, Recalculate} information; policy information; and current underlay G information;
deterministically determining, at the map server/map resolver controller, an underlay multicast group comprising the set of ingress and/or egress tunnel routers or a portion thereof, for the given overlay multicast stream using the received policies and/or parameterized intent; and
transmitting, from the map server/map resolver controller, to the set of ingress and/or egress tunnel routers, the determined underlay multicast group for the given overlay multicast stream,
wherein the step of deterministically determining the underlay multicast group comprises mapping an overlay multicast group native of another network to an underlay LISP-multicast group without use of a hash operator.

16. The method of claim 15, wherein the step of deterministically determining the underlay multicast group comprises collating tuples of information in the request to generate a new underlay group G.

17. The method of claim 15, wherein the requests comprises a join-interest message comprises a LISP extensible message.

18. The method of claim 15, wherein the step of deterministically determining underlay multicast group comprises:
identifying overlay Gs of a second network having a same set of xTRs of the LISP network; and
aggregating the identified overlay Gs to a same underlay Gs for any identified overlay Gs of the second network having the same set of xTRs.

19. A non-transitory computer readable medium having instructions stored thereon, wherein execution of the instructions by a processor, causes the processor to:
implement a map server-map resolver;
receive assignment and reassignment configuration from a controller of a first network;
receive, from egress and ingress tunnel routers in the first network, requests for a group address for a given overlay multicast stream, wherein the overlay multicast stream is associated with a multicast group natively defined in a second network;
deterministically determine an underlay multicast group for the given overlay multicast stream using the received assignment and reassignment configuration; and
transmit the determined underlay multicast group for the given overlay multicast stream to the tunnel router,
wherein the step of deterministically determining the underlay multicast group comprises collating tuples of information in the requests to generate a new underlay group G.

20. A system comprising:
a processor; and
a memory having instructions stored thereon, wherein execution of the instructions by the processor causes the processor to:
implement a map server/map resolver (MR-MS);
receive policies and/or parameterized intent of a network administrator from a controller of a first network;
receive, from a set of ingress and/or egress tunnel routers of the first network, requests for a group address for a given overlay multicast stream defined by a multicast group in a second network;
deterministically determine an underlay multicast group comprising the set of ingress and/or egress tunnel routers or a portion thereof, for the given overlay multicast stream using the received policies and/or parameterized intent; and
transmit the determined underlay multicast group for the given overlay multicast stream to the set of ingress and/or egress tunnel routers
wherein the set of ingress and/or egress tunnel routers comprises LISP xTR, and wherein the instructions to deterministically assign or reassign the overlay multicast traffic include receiving, from an ingress tunnel router or an egress tunnel router, a join-interest message, wherein the join-interest message includes an endpoint identifier (EID) of a receiver and an overlay multicast (s,g) information of the interested receiver(s), and wherein the endpoint identifier and the overlay multicast (s,g) information are used in the assignment and/or reassignment in accordance with the assignment and reassignment configuration.

21. The system of claim 20, wherein the instructions to deterministically assign or reassign overlay multicast traffic, when executed by the processor, further cause the processor to:
transmit the determined underlay multicast group data to an xTR hosting a source of the determined underlay multicast group.

22. The system of claim 20, wherein the join-interest message comprises a LISP extensible message, wherein the LISP extensible message comprises a MAP-REGISTER message or a MAP-LOOKUP extendible message.

23. The system of claim 20, wherein the instructions to deterministically assign or reassign overlay multicast traffic, when executed by the processor, further cause the processor to
cache the endpoint identifier (EID) of the receiver and the overlay multicast (s,g) information of the interested receiver(s), wherein the cached information is used for subsequent reassignments operation.

24. The system of claim 20, wherein the instructions to deterministically assign or reassign overlay multicast traffic, when executed by the processor, further cause the processor to:
collate the tuple of information to generate a new underlay group G, wherein the tuple of information include information selected from the group consisting of overlay g information; a set of receiver EIDs information; sender RLOC information; a set of receiver RLOCs information; state:: {Assigned, Recalculate} information; policy information; and current underlay G.

* * * * *